United States Patent
Nutt et al.

(10) Patent No.: US 10,755,002 B2
(45) Date of Patent: Aug. 25, 2020

(54) METHOD AND APPARATUS FOR FACILITATING CREATION OF SIMULATION MODEL

(71) Applicant: GE-Hitachi Nuclear Energy Americas LLC, Wilmington, NC (US)

(72) Inventors: Larry Edwin Nutt, Wilmington, NC (US); Wayne Marquino, Wilmington, NC (US)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 401 days.

(21) Appl. No.: 15/593,432

(22) Filed: May 12, 2017

(65) Prior Publication Data

US 2018/0330028 A1    Nov. 15, 2018

(51) Int. Cl.
  *G06F 30/18* (2020.01)
  *G06F 16/83* (2019.01)
  *G06F 30/20* (2020.01)
  *H04L 29/08* (2006.01)

(52) U.S. Cl.
  CPC .............. *G06F 30/18* (2020.01); *G06F 16/83* (2019.01); *G06F 30/20* (2020.01); *H04L 67/32* (2013.01)

(58) Field of Classification Search
  CPC ........ G09B 9/00; G05B 17/02; G05B 19/042; G05B 23/027; G06F 17/5004; G06F 9/4488; G06F 16/256; G06Q 10/06; H04L 67/12; C10G 11/187
  See application file for complete search history.

(56) References Cited

U.S. PATENT DOCUMENTS

| | | | |
|---|---|---|---|
| 9,002,809 B2 | 4/2015 | Maier | |
| 2002/0077711 A1* | 6/2002 | Nixon | C10G 11/187 700/51 |
| 2003/0200062 A1* | 10/2003 | Dessureault | G06F 17/5004 703/1 |
| 2004/0024662 A1* | 2/2004 | Gray | G06Q 10/06 705/29 |

(Continued)

FOREIGN PATENT DOCUMENTS

WO    WO-2011049890 A1    4/2011

OTHER PUBLICATIONS

International Search Report PCT/ISA/210 for International Application No. PCT/US2018/032047 dated Aug. 27, 2018.

(Continued)

*Primary Examiner* — Kandasamy Thangavelu
(74) *Attorney, Agent, or Firm* — Harness, Dickey & Pierce, P.L.C.

(57) ABSTRACT

A method of facilitating modeling of a system includes receiving, at a processor, an extensible markup language (XML) file corresponding to a piping and instrumentation diagram (PID) of the system; identifying, by the processor, components of the system that are described in the XML file, the XML file including information about attributes of the identified components; storing, by the processor, the information about the attributes of the identified components; and generating, by the processor, a simulation model page using syntax of a simulation modeling software environment, based on the stored information about the attributes of the identified components.

18 Claims, 7 Drawing Sheets

(56) References Cited

U.S. PATENT DOCUMENTS

| | | | |
|---|---|---|---|
| 2005/0007249 A1* | 1/2005 | Eryurek | G05B 23/027 340/511 |
| 2007/0168060 A1* | 7/2007 | Nixon | G06F 9/4488 700/83 |
| 2007/0179644 A1 | 8/2007 | Ravish et al. | |
| 2009/0282067 A1* | 11/2009 | Bendigeri | G05B 19/042 |
| 2009/0292514 A1* | 11/2009 | McKim | G09B 9/00 703/6 |
| 2012/0072386 A1 | 3/2012 | Willems et al. | |
| 2012/0095603 A1* | 4/2012 | Rashid | E21B 43/00 700/282 |
| 2013/0123944 A1 | 5/2013 | Reichard et al. | |
| 2015/0178422 A1 | 6/2015 | McKim et al. | |
| 2015/0301071 A1* | 10/2015 | Dhan | G01N 35/0092 702/108 |
| 2015/0323512 A1* | 11/2015 | Vikstrom | G16C 99/00 702/123 |
| 2016/0161930 A1* | 6/2016 | Jirkovsk | G05B 17/02 700/29 |
| 2017/0103103 A1* | 4/2017 | Nixon | G06F 16/256 |
| 2018/0210428 A1* | 7/2018 | Jundt | H04L 67/12 |

OTHER PUBLICATIONS

Written Opinion of the International Searching Authority PCT/ISA/237 for International Application No. PCT/US2018/032047 dated Aug. 27, 2018.

Oppelt, Mathias et al., "Automatic Model Generation for Virtual Commissioning based on Plant Engineering Data," The International Federation of Automatic Control, Cape Town, South Africa. Aug. 24-29, 2014.

\* cited by examiner

400

```xml
<Equipment ComponentName="Filter" ComponentClass="Solid-LiquidSeparationEquipment" ID="SP70A6483926D04E4F8971798D3F2BA36C" TagName="Filter-0121">
  <GenericAttributes Number="18"/>
  <PersistentID Context="SmartPID - ESBWRPIDPLANT" Identifier="SP70A6483926D04E4F8971798D3F2BA36C"/>
  <Position>
    <Location Y="0.2438519182879" X="0.666418223308693" Z="0"/>
    <Axis Y="0" X="0" Z="1"/>
    <Reference Y="0" X="1" Z="0"/>
  </Position>
  <Presentation B="0" G="0" R="0.545" LineWeight="0.00035" LineType="Solid" Color="DarkRed" Layer="Default"/>
  <Extent>
    <Min Y="0.2438519182879194" X="0.658788363116553"/>
    <Max Y="0.259111638672994356" X="0.674048083350122991"/>
  </Extent>
  <Line/>
  <Line/>
  <Line/>
  <Line/>
  <Line/>
  <Line/>
  <Line/>
  <Line/>
  <Line/>
  <Nozzle ComponentName="Flanged Nozzle" ComponentClass="Nozzle" ID="SP4E731C905AAC4730A06B831EA7A51B2E"/>
  <Nozzle ComponentName="Flanged Nozzle" ComponentClass="Nozzle" ID="SPAE7F986755B1476BB501A28F619C9026"/>
</Equipment>
```

FIG. 4

METHOD AND APPARATUS FOR FACILITATING CREATION OF SIMULATION MODEL

BACKGROUND

1. Field

The subject matter disclosed herein relates generally to the field of creating simulation models of process plants.

2. Description of Related Art

Simulation models are used to test designs for various types of systems. Simulation models include various components and interconnections between components based on the components and interconnections included in the system being modeled. In some cases, detailed information regarding the components and interconnections of a system are described in a diagram. An example of such a diagram is a piping and instrumentation diagram (PID or P&ID). A PID of a system visually depicts the components and interconnections of the system. A simulation engineer designing a simulation model of a system can refer to components and interconnections illustrated in a PID of the system, and enter each of the illustrated components and interconnections into simulation modeling software to create the simulation model of the system.

SUMMARY

According to at least some example embodiments, a method of facilitating modeling of a system includes receiving, at a processor, an extensible markup language (XML) file corresponding to a piping and instrumentation diagram (PID) of the system; identifying, by the processor, components of the system that are described in the XML file, the XML file including information about attributes of the identified components; storing, by the processor, the information about the attributes of the identified components; and generating, by the processor, a simulation model page using syntax of a simulation modeling software environment, based on the stored information about the attributes of the identified components.

The system may be a process plant system.

The XML file may follow PID XML Standard ISO 15926.

The identifying may include, for each identified component, identifying, in the XML file, an XML element corresponding to the component.

The method may further include generating, by the processor, for each identified XML element, a component object data structure corresponding to the identified XML element.

The method may further include for each identified XML element, extracting, by the processor, attribute information of the identified XML element from the XML file.

The storing may include for each generated component object data structure, storing, as one or more elements of the generated component object data structure, the attribute information extracted from the identified XML element to which the generated component object data structure corresponds.

The storing may include generating a list of strings defining the identified components, the list of strings including information based on the information about the attributes of the identified components.

The generating of the simulation model page may include reading from the list of strings, by the processor, attributes of each component defined the list of strings; creating a simulation object for each component defined by the list of strings, based on the read attributes; and populating the simulation model page with the simulation objects created for the components defined by the list of strings.

According to at least some example embodiments, a simulation model generating apparatus includes memory storing computer-executable instructions; and one or more processors configured to execute the computer-executable instructions such that the one or more processors are configured to perform operations including, receiving an extensible markup language (XML) file corresponding to a piping and instrumentation diagram (PID) of a system, identifying components of the system that are described in the XML file, the XML file including information about attributes of the identified components, storing the information about the attributes of the identified components, and generating a simulation model page using syntax of a simulation modeling software environment, based on the stored information about the attributes of the identified components.

The system may be a process plant system.

The XML file may follow PID XML Standard ISO 15926.

The one or more processors may be configured to execute the computer-executable instructions such that the identifying includes, for each identified component, identifying, in the XML file, an XML element corresponding to the component.

The one or more processors may be configured to execute the computer-executable instructions such that the one or more processors are further configured to generate, for each identified XML element, a component object data structure corresponding to the identified XML element.

The one or more processors may be configured to execute the computer-executable instructions such that the one or more processors are further configured to, for each identified XML element, extract attribute information of the identified XML element from the XML file.

The one or more processors may be configured to execute the computer-executable instructions such that the storing includes, for each generated component object data structure, storing, as one or more elements of the generated component object data structure, the attribute information extracted from the identified XML element to which the generated component object data structure corresponds.

The one or more processors may be configured to execute the computer-executable instructions such that the storing includes generating a list of strings defining the identified components, the list of strings including information based on the information about the attributes of the identified components.

The one or more processors may be configured to execute the computer-executable instructions such that the generating of the simulation model page includes reading, from the list of strings, attributes of each component defined the list of strings, creating a simulation object for each component defined by the list of strings, based on the read attributes, and populating the simulation model page with the simulation objects created for the components defined by the list of strings.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 4 illustrates an element in a portion of an extensible markup language (XML) file corresponding to a PID.

DETAILED DESCRIPTION

Figure 1:
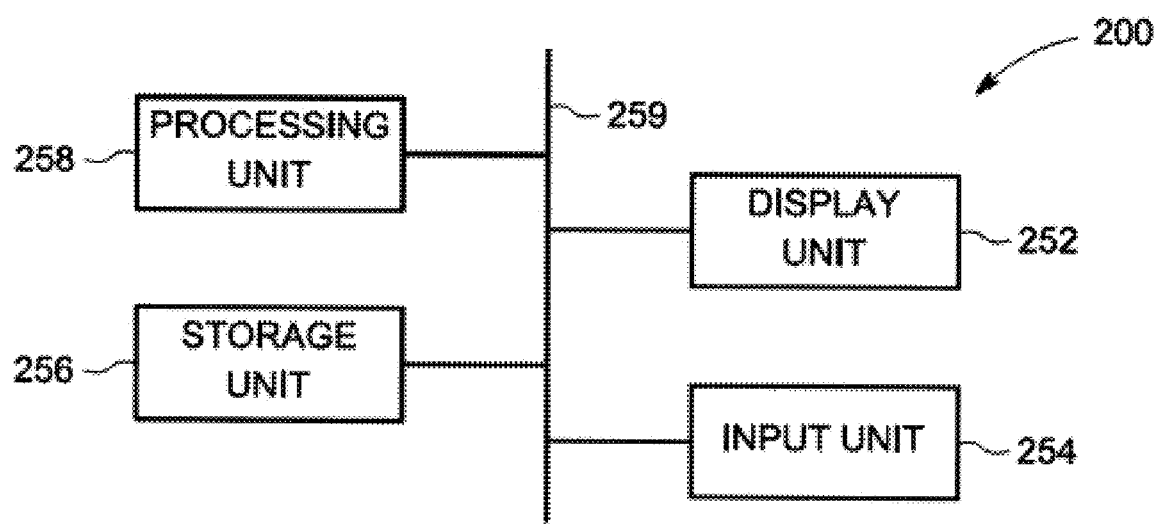
FIG. 1 is a block diagram illustrating an example of simulation model generating apparatus according to at least some example embodiments

According to at least some example embodiments, simulation model generating methods and apparatuses are described, herein, in terms of design documents, for example a piping and instrumentation diagram (PID or P&ID), of a process plant and a simulation platform. However the simulation model generating methods and apparatuses according to at least some example embodiments can be applied to development of simulation models of other processes, where the design is documented in terms of objects with pre-defined attributes, which can be mapped into the attributes of objects in a simulation platform, because the simulation model generating methods and apparatuses according to at least some example embodiments include a|[JAMBROSE1] design tool and simulation tool that are object based.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As is discussed above, a simulation designer designing a simulation model of a system can refer to a PID of the system to learn the components and interconnections of the process plant being modeled. The PID can be drawn in a software (SW) environment. Similarly, the simulation model is often developed in a SW environment. A simulation modeling software environment may include a GUI interface through which a simulation model may be input or defined, and/or the simulation modeling software may accept definitions of the model through an input file, e.g. ASCII. According to at least some related methods of designing a simulation model, a simulation engineer enters each component and interconnection illustrated in a PID into simulation modeling software, manually (e.g., through the GUI interface). For example, if a PID illustrates two system elements (e.g. two tanks) connected to each other by a pipe, a software engineering would manually add the two system elements to a simulation model, and manually add a pipe connecting the two simulation elements to the simulation model, using simulation modeling software. Accordingly, the process of a simulation engineer manually creating a simulation model of a system based on a PID of the system can be time consuming, particularly when the system is a large system with hundreds or more of components and interconnections (e.g., a power plant system or chemical processing plant system).

Some software packages for designing PIDs include an export function that generates an extensible markup language (XML) code representation of the components and interconnections illustrated by a PID. For example, the XML code generated by PID software may follow PID XML Standard ISO 15926.

According to at least some example embodiments, a simulation model generating method includes extracting information defining the components and interconnections illustrated in a PID from the XML code representation of the PID, and generating a simulation model based on the extracted information. According to at least some example embodiments, the simulation model is generated automatically, without the need for a simulation engineer to enter each component and interconnection illustrated in a PID into simulation modeling software manually. Examples of the simulation model generating method according to example embodiments are discussed in greater detail below with reference to FIGS. 2-8. An example of a simulation model generating apparatus that implements the simulation model generating method will now be discussed below with reference to FIG. 1.

FIG. 1 is a block diagram illustrating an example of simulation model generating apparatus according to at least some example embodiments. Referring to FIG. 1, a simulation model generating apparatus 200 may include, for example, a data bus 259, a display unit 252, an input unit 254, a storage unit 256, and a processing unit 258.

The display unit 252, input unit 254, storage unit 256, and processing unit 258 may send data to and/or receive data from one another using the data bus 259.

The display unit 252 displays information in a graphical manner, for example, for viewing by a user. The display unit 252 may include any device capable of displaying information including, for example, one or more of a monitor, a television, a liquid crystal display (LCD) display, a light emitting diode (LED) display, a cathode ray tube (CRT) display, a projector, and the like.

The input unit 254 receives data as input, for example, from a user. The input unit 245 may include any device capable of receiving input data including, for example, one or more of a mouse, a touchpad, a touchscreen, a keyboard, a microphone, a camera, and the like.

The storage unit 256 may be any device capable of storing data including one or more of volatile memory, nonvolatile memory, magnetic storage, flash storage, random access memory (RAM), and the like.

The processing unit 258 may be any device that is capable of processing data and is configured to carry out specific operations based on input data, or configured to execute instructions included in computer readable code including, for example code stored in the storage unit 256.

According to at least some example embodiments, the simulation model generating apparatus 200 may be programmed, in terms of software and/or hardware, to perform any or all of the functions described herein as being performed by a simulation model generating apparatus, as well as any or all functions described below with reference to FIGS. 2-8. Consequently, the simulation model generating apparatus 200 described herein may be embodied as a special purpose computer through software and/or hardware programming.

Examples of the simulation model generating apparatus 200 being programmed, in terms of software, to perform any or all of the functions described herein as being performed by a simulation model generating apparatus will now be discussed below. For example, the storage unit 256 may store a program including executable instructions corresponding to any or all of the operations described herein as being performed by a simulation model generating apparatus. According to at least one example embodiment, additionally or alternatively to being stored in the storage unit 256, the executable instructions may be stored in a computer-readable medium including, for example, an optical disc, flash drive, SD card, etc., and the simulation model generating apparatus 200 may include hardware for reading data stored on the computer readable-medium. Further, the processing unit 258 may be a processor configured to perform any or all of the operations described herein as being performed by a simulation model generating apparatus 200 and/or any or all functions described below with reference to FIGS. 2-8, for example, by reading and executing the executable instructions stored in at least one of the storage unit 256 and a computer readable storage medium loaded into hardware included in the simulation model generating apparatus 200 for reading computer-readable mediums.

The term 'processor,' as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor, a multiprocessor, an application-specific integrated circuit (ASIC), and a field programmable gate array (FPGA). Processors executing program code are programmed processors, and thus, are special-purpose computers Examples of the simulation model generating apparatus 200 being programmed, in terms of hardware, to perform any or all of the functions described herein as being performed by a simulation model generating apparatus will now be discussed below. Additionally or alternatively to executable instructions corresponding to the functions described herein as being performed by a simulation model generating apparatus being stored in a storage unit or a computer-readable medium as is discussed above, the processing unit 258 may include a circuit that has a structural design dedicated to performing any or all of the operations described herein as being performed by a simulation model generating apparatus and/or any or all functions described below with reference to FIGS. 2-8. For example, the above-referenced circuit included in the processing unit 258 may be a FPGA or ASIC physically programmed, through specific circuit design, to perform any or all of the operations described herein as being performed by a simulation model generating apparatus.

Figure 2:
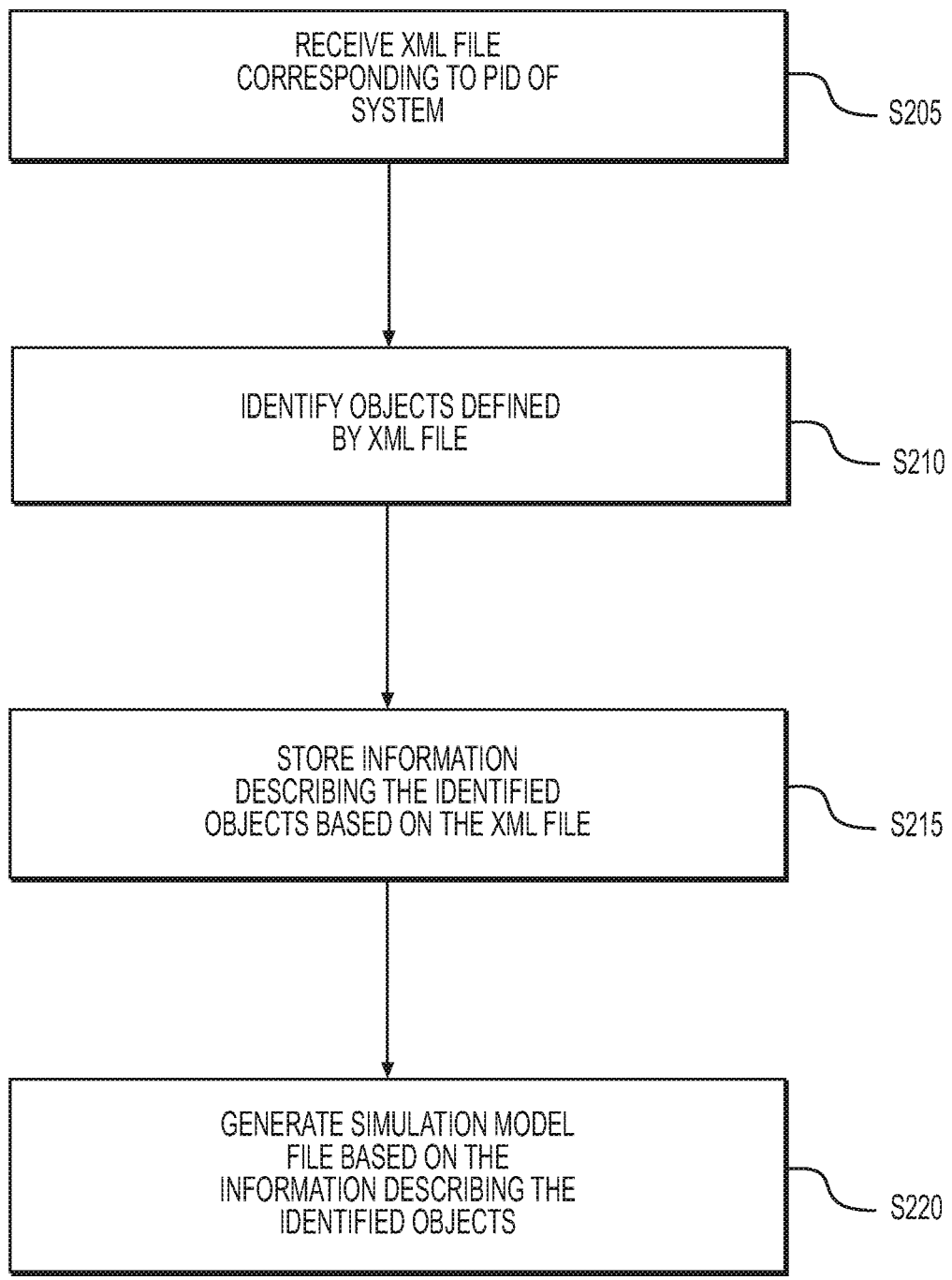
FIG. 2 is a flow chart illustrating an example of a simulation model generating method.

FIG. 2 is a flow chart illustrating an example of a simulation model generating method according to at least some example embodiments.

Referring to FIG. 2, in operation S205, an XML file corresponding to a PID of a system is received. For example, in operation S205, the simulation model generating apparatus 200 may receive an XML file corresponding to a PID of a system. For example, if the system being modeled by the simulation model generating apparatus is a system of a process plant (e.g., a power plant or chemical processing plant) the XML file may be a file corresponding to a PID of a process plant. According to at least some example embodiments, PID generating software used to create or access the PID of the system may export the PID of the system in the form of the XML file received by the simulation model generating apparatus 200 in operation S205. According to at least some example embodiments, the exported XML file follows PID XML Standard ISO 15926. An example of a PID and XML data corresponding to a PID will now be discussed below with reference to FIGS. 3 and 4.

Figure 3:
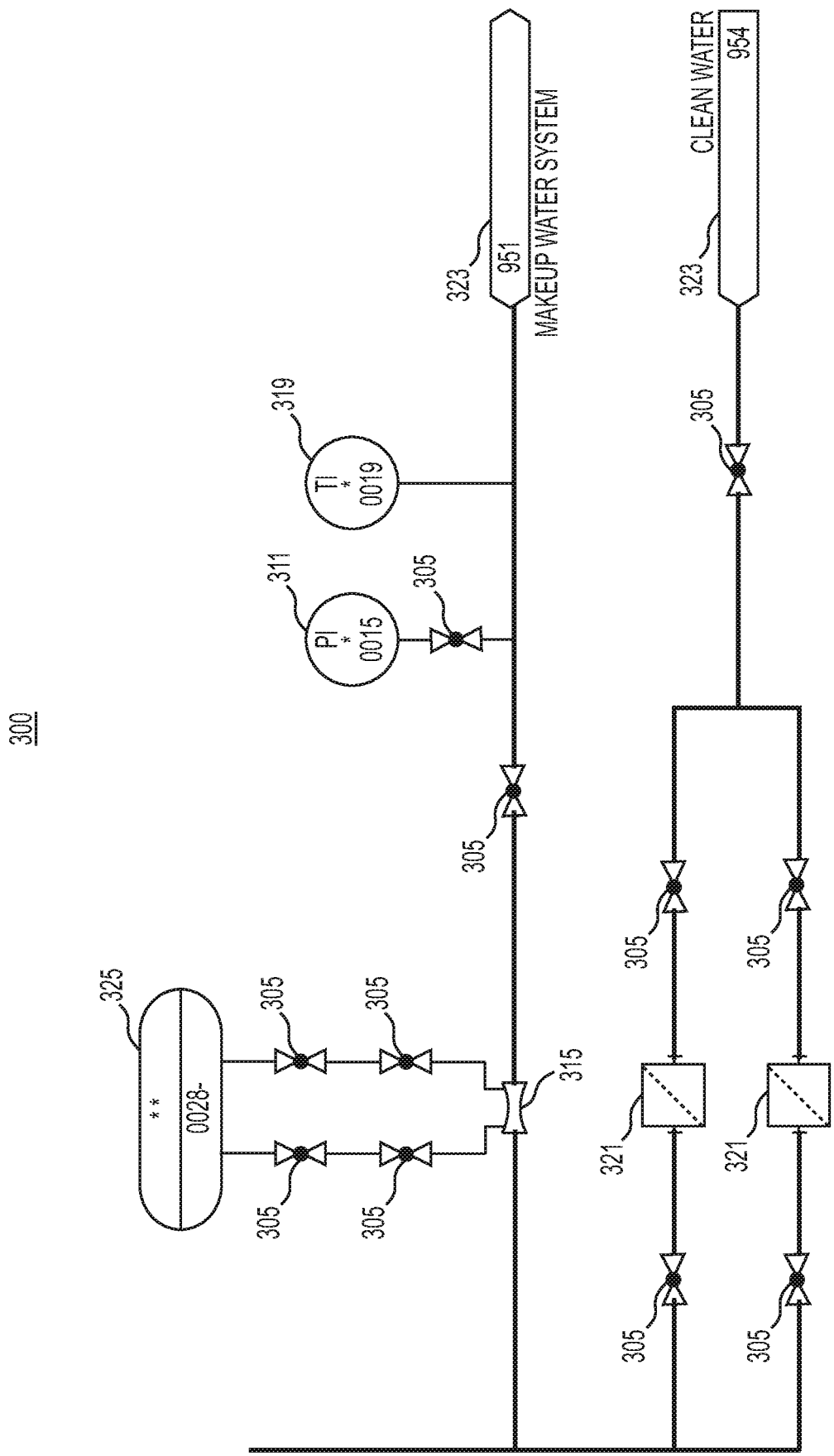
FIG. 3 illustrates an example of a portion of a piping and instrumentation diagram (PID or P&ID).

FIG. 3 illustrates an example of a portion of a PID 300. The portion of the PID 300 illustrated in FIG. 3 may be a portion of a single page of the PID 300. The PID 300 may span several pages. The PID 300 illustrated in FIG. 3 is a PID describing a system or systems of a nuclear power plant. However, a PID describing a system or systems of a nuclear power plant is used only as an example. PIDs can be generated for several different types of systems, and the PID to which the XML file received in operation S205 is not limited to being a PID that describes systems associated with nuclear power plants.

As is shown in FIG. 3, a PID can include visual depictions of several different types of components included in the system or systems being illustrated by the PID. As is also shown in FIG. 3, different types of components may be illustrated using different types of symbols known to those of ordinary skill in the subject matter area of the system or systems illustrated in the PID. For example, the symbols used in a PID like that shown in FIG. 3 are defined in a legend and used consistently across multiple diagrams. For example, the symbols illustrated in PID 300 are recognizable to those familiar with PIDs for nuclear power plant designs. Examples of components within the portion of the PID 300 illustrated in FIG. 3 include valves 305, a pressure instrument 311, a Venturi/orifice 315, a temperature instrument 319, filters 321, an off page connector 323 and a differential pressure instrument 325. Valves 305 are used for isolating/controlling flow in the system described by the PID 300. The differential pressure instrument 325 and temperature instrument are used for measuring pressure and temperature, respectively, in the system described by the PID 300. The Venturi/orifice 315 creates a decrease in area for measuring differential pressure to measure flow in the system described by the PID 300. The filters 321 remove particles in from liquid in the system described by the PID 300. The off page connectors 323 each designate and label a system connection to another page of the PID 300. In the example shown in FIG. 3, that off page connectors 323 connect the portion of the PID 300 illustrated in FIG. 3 to clean water 954 and a makeup water system 951. The differential pressure instrument 325 measures a difference in pressure between two points in the system described by the PID 300. Further examples of components that could be included in the PID 300 include, but are not limited to, tanks and/or vessels, and silencers. The tanks and/or vessels can be used, for example, for storing mass and/or providing make up water to the system described by the PID 300. The silencers can be used, for example to create restrictions to flow or to remove turbulence. As is also shown in FIG. 3, interconnections between the several different types of components can also be included in a PID. For example, the interconnections illustrated in the PID 300 may represent, for example, piping in between various components of a system or systems of a nuclear power plant. As is noted above, a PID can be exported in the form of an XML file. An excerpt from such an XML file is illustrated in FIG. 4.

FIG. 4 illustrates a portion of an XML file 400. The XML file 400 corresponds to the PID 300. As is illustrated in FIG. 4, the XML file 400 includes XML data, i.e., data expressed using XML syntax. The XML file 400 follows the PID XML Standard ISO 15926. The portion of XML file 400 shown in FIG. 4 illustrates XML data describing the filter component Filter-0121, which is one of the filters 321 illustrated in the PID 300 of FIG. 3. The filter component Filter-0121 is also referred to, in the present disclosure, simply as "the Filter-0121 component." The Filter-0121 component could be either one of the two filters 321 illustrated in FIG. 3. The Filter-0121 component is represented in the XML file 400 as the "Equipment" element illustrated in FIG. 3B (i.e., the XML element named "Equipment" illustrated in FIG. 4). The illustrated "Equipment" element includes "ComponentName," "ComponentClass," "ID," and "TagName" attributes, each of which correspond to the component being described by the "Equipment" element which, in the example illustrated in FIG. 4, is the Filter-0121 component. The ComponentName attribute indicates that a component type of the Filter-0121 component is a filter. The ComponentClass attribute indicates a class of components to which the Filter-0121 component belongs. According to at least some example embodiments, the TagName attribute indicates a tag (i.e., "Filter-0121") which may be illustrated in the PID 300 as a visual identifier of the Filter-0121 component. However, for the ease of description, the filters 321 are illustrated in the PID 300 of FIG. 3 using only reference numerals, and not tag names. The ID attribute indicates an identifier value for the Filter-0121 component described by the "Equipment" element illustrated in FIG. 4. According to at least some example embodiments, the identifier value of the ID attribute may uniquely identify, with respect to all components described in the XML file 400 and/or included in the PID 300, the Filter-0121 component described by the "Equipment" element illustrated in FIG. 4. For example, even in a case where the TagName "Filter-0121" may be used for more than one filter described in the XML file 400 and/or included in the PID to which the XML file 400 corresponds, the identifier value of the ID attribute of the "Equipment" element illustrated in FIG. 4 must be unique to the particular instance of the Filter-0121 component described by the "Equipment" element illustrated in FIG. 4. The unique ID attribute identifies the component to which the ID attribute corresponds differentiates the identified component from similar components in design documents (e.g., the PID) and the simulation model.

The illustrated "Equipment" element of the XML file 400 of FIG. 4 includes several sub-elements which may also be referred to as child elements. These sub-elements describe additional features of the filter component described by the "Equipment" element. The addition features include, for example, a position of the filter component within the PID to which the XML file 400 corresponds, an extent of the filter component within the PID to which the XML file 400 corresponds (e.g., maximum and minimum horizontal positions and maximum and minimum vertical positions of the filter component within the PID to which the XML file 400 corresponds), and lines and colors included in the filter component within the PID to which the XML file 400 corresponds. The sub-elements also include descriptions of several nozzles included in the filter component.

Though, for the purpose of simplicity, FIG. 4 illustrates only XML data corresponding to a single filter component, the XML file 400 may include XML data describing any or all components included in the PID to which the XML file 400 corresponds. Further, the items described by the XML data included in the XML file 400 may be of several different types. Because, as is noted above, the XML file 400 is an example of an XML file exported from a PID that illustrates a system or systems of a nuclear power plant, examples of the different types of components that may be described in the XML file 400 include, but are not limited to, pumps, valves, filters, tanks, piping segments, measuring instrumentation, silencers, and page connectors. The page connectors depict connections that span adjacent pages of a multi-page PID.

Further, as is known, the specific types of attributes and/or sub-elements included in an element or sub-element of the XML file 400 may vary depending on the type of component being described by the element or sub-element of the XML file 400. For example, because the "Equipment" element illustrated in FIG. 4 describes the Filter-0121 component, the types of attributes and/or sub-elements include the "Equipment" element illustrated in FIG. 4 correspond to filters. Consequently, elements or sub-elements of the XML file 400 that describe components other than filters may include types of attributes and/or sub-elements that differ from the types of attributes and sub-elements in the "Equipment" element illustrated in FIG. 4.

The PID 300 and XML file 400 are generated using P&ID (computer-aided design) CAD software. The example of the PID 300 depicted in FIG. 3 is an example of a PID generated using SmartPlant® P&ID software, and the example of the portion of XML file 400 depicted in FIG. 4 is an example of a portion of an XML file generated using SmartPlant® P&ID software. However, SmartPlant® P&ID software is just one example among several known types/brands of P&ID CAD software which may be used to generate PIDs and XML files for use with the simulation model generating method illustrated in FIG. 2. For example, according to at least some example embodiments, the XML file retrieved in operation S205 of FIG. 2 and the PID to which the retrieved XML file corresponds can both be generated by any P&ID CAD software capable of generating XML data in accordance with the PID XML Standard ISO 15926.

Returning to FIG. 2, in operation S210, objects (i.e., components) defined by the XML file are identified. For example, according to at least some example embodiments, in operation S210, the simulation model generating apparatus 200 may identify components defined by the XML file that was received by the simulation model generating apparatus 200 in operation S205. As is noted above with reference to FIG. 4, an XML file corresponding to a PID may include XML data describing any or all of components, and interconnections between components, illustrated in the PID to which the XML file corresponds. In operation S210, the simulation model generating apparatus 200 may read the XML data included in an XML file that was exported from a PID file, and identify the various components described by the XML file. For example, the simulation model generating apparatus 200 may read the XML file and identify the components described by the XML file based on the attribute information included in the elements and/or sub-elements included in the XML file. Using the structure of the "Equipment" element of the XML file 400 illustrated in FIG. 4 as an example, in operation S210, the simulation model generating apparatus 200 may determine a type of a component described by an element included in the XML file 400 by reading the "ComponentName" attribute of the element, determine a name or tag of the component described by the element included in the XML file 400 by reading, for example, the "TagName" or "ItemTag" attribute of the element, and determine an identifier value of a component described by an element included in the XML file 400 by reading the "ID" attribute of the element. According to at least some example embodiments, the XML file may also specify performance data of the components included in the XML file 400, e.g. flowrate, flow area, heat transfer area, length, filter efficiency, which is needed for the simulation platform. Alternately, the performance information may be read from a separate file. Further, though an XML file is used as an example of a file in which the above-referenced performance data may be stored, the performance data can be stored in formats other than XML.

In operation S215, information describing the identified components is stored, based on the XML file. For example, in operation S215, the simulation model generating apparatus 200 may store information describing the components that were identified by the simulation model generating apparatus 200 in operation S210. The simulation model generating apparatus 200 may extract information describing the identified components from the XML file that was received by the simulation model generating apparatus 200 in operation S205, and store the extracted data, for example, in the storage unit 256. According to at least some example embodiments, for each component the simulation model generating apparatus 200 identified in operation S210, in operation S215, the simulation model generating apparatus 200 may create an array corresponding to the component, populate the array with information corresponding to the attributes and/or sub-elements of the element or sub-element describing the component in the XML file, and store the array. For example, an example component array that corresponds to the Filter-0121 component described by the "Equipment" element illustrated in FIG. 4 and may be created by the simulation model generating apparatus 200 in operation S215 is illustrated in Table 1, below.

TABLE 1

| Component Array Element Type | Component Array Element Value |
|---|---|
| ID | SP70A6483926D04E4F897179BD3F2BA36C |
| Component Name | Filter |
| TagName | Filter-0121 |
| PosX | [X coordinate of the position of the Filter-0121 component] |
| PosY | [Y coordinate of the position of the Filter-0121 component] |
| NozID | SP4E731C905AAC4730A06B831EA7A51B2E |
| NozName | Flanged Nozzle |
| NozPosX | [X coordinate of the position of nozzle "SP58..."] |
| NozPosY | [Y coordinate of the position of nozzle "SP58..."] |
| NozID | SPAE7F9B675581476BB501A28F619C9D26 |
| PMinX | [minimum X coordinate of the Filter-0121 component] |
| PMinY | [minimum Y coordinate of the Filter-0121 component] |
| PMaxX | [maximum X coordinate of the Filter-0121 component] |
| PMaxY | [maximum Y coordinate of the Filter-0121 component] |

As is illustrated in Table 1, the array corresponding to the Filter-0121 component may include, as a value of an "ID" array element, the value of the "ID" attribute extracted by the simulation model generating apparatus 200 from the "Equipment" element of the XML file 400 that describes the Filter-0121 component. The array illustrated in Table 1 that corresponds to the Filter-0121 component may include, as a value of a "Name" array element, the value of the "ComponentName" attribute extracted by the simulation model generating apparatus 200 from the "Equipment" element of the XML file 400 that describes the Filter-0121 component. The array illustrated in Table 1 that corresponds to the Filter-0121 component may include, as a value of a "TagName" array element, the value of the "TagName" attribute extracted by the simulation model generating apparatus 200 from the "Equipment" element of the XML file 400 that describes the Filter-0121 component. The array illustrated in Table 1 that corresponds to the Filter-0121 component may include, as values of "PosX" and "Posy" array elements, respectively, "X" and "Y" values of the "Position" sub-element extracted by the simulation model generating apparatus 200. The array illustrated in Table 1 that corresponds to the Filter-0121 component may include, as 4 different "NozID" array elements, the values of the 4 "ID" attributes extracted by the simulation model generating apparatus 200, respectively, from the 4 different "Nozzle" sub-elements of the "Equipment" element of the XML file 400 that describes the Filter-0121 component. Further, the array illustrated in Table 1 that corresponds to the Filter-0121 component may include, for each "NozID" array element, corresponding "NozName," "NozPosX," and "NozPosY" array elements. As is illustrated in Table 1, the simulation model generating apparatus 200 may group the "NozName," "NozPosX," and "NozPosY" array elements with the "NozID" array element to which the "NozName," "NozPosX," and "NozPosY" array elements correspond. The simulation model generating apparatus 200 may extract, as the value of the "NozName" array element of the array illustrated in Table 1, the "ComponentName" attribute of the corresponding one of the 4 "Nozzle" sub-elements of the "Equipment" element of the XML file 400 that describes the Filter-0121 component. The simulation model generating apparatus 200 may extract, as the values of the "NozPosX" and "NozPosY" array elements of the array illustrated in Table 1, respectively, "X" and "Y" values of a "Position" sub-element of the corresponding one of the 4 "Nozzle" sub-elements of the "Equipment" element of the XML file 400 that describes the Filter-0121 component. The simulation model generating apparatus may extract, as the "PMinX" array element of the array illustrated in Table 1, an "X" attribute of a "Min" sub-element of the "Extent" sub-element of the "Equipment" element of the XML file 400 that describes the Filter-0121 component. The simulation model generating apparatus may extract, as the "PMinY" array element of the array illustrated in Table 1, a "Y" attribute of a "Min" sub-element of the "Extent" sub-element of the "Equipment" element of the XML file 400 that describes the Filter-0121 component. The simulation model generating apparatus may extract, as the "PMaxX" array element of the array illustrated in Table 1, an "X" attribute of a "Max" sub-element of the "Extent" sub-element of the "Equipment" element of the XML file 400 that describes the Filter-0121 component. The simulation model generating apparatus may extract, as the "PMaxY" array element of the array illustrated in Table 1, a "Y" attribute of the "Max" sub-element of the "Extent" sub-element of the "Equipment" element of the XML file 400 that describes the Filter-0121 component.

Table 1, above, is provided as an example of an array that includes attributes of a component listed in an XML file. However, an array created for a component described in an XML file is not limited to including only the information shown in Table 1. Additional types of information that may be included in the array shown in Table 1 include, but are not limited to, identification of graphical elements of the component corresponding to the array, topology information about the component corresponding to the array, and information about dimensions of the component corresponding to the array (e.g., pipe diameters).

Further, table 1, above, is provided as an example of a component array created for a filter component described by XML file 400. Accordingly, the contents of the component array shown in Table 1 correspond to attributes of a filter component. Those skilled in the art will understand that component arrays created for components other than filter components (e.g., page connector, piping segment, tank, valve, check valve, and/or pump components) may include types of attributes that correspond to attributes of the type of component for which the component array is created, and may differ from at least some of the types of attributes included in Table 1.

Table 1 is discussed above with reference to an example in which the contents of Table 1 are stored in an array data structure. However, according to at least some example embodiments, instead of, or in addition to, storing the contents of Table 1 in an array data structure, the contents of Table 1 may also be stored in an object data structure that includes elements corresponding to each of the elements discussed above as being included in Table 1.

In addition to the topology and arrangement of components other information can be provided in the ISO file. For example the diameter of pipes is exported to the XML file, and this can be loaded into the simulation model to characterize the hydraulic resistance of the flow paths.

3D CAD models are also typically available when the simulation model is created. Exporting piping data from a 3D CAD model correlated with the EquipmentID or "ID" (which uniquely identifies each component) can facilitate identification of the lengths of flow paths, and elevation differences between components, in a simulation hydraulic model. The 3D model can also identify elbows, and tee's in the piping whose flow resistance coefficient can be determined using correlations such as Idelchik or the Crane handbook.

SW tools used to produce the P&ID often are used to load in a database additional design information which is needed to procure the equipment. Database reports from the design tool indexed by EquipmentID or "ID" (which uniquely identifies each component) can be reformatted and imported into most simulation tools, once the topology and arrangement of components is defined through this process. Examples of the type of information available are pump rated head and flowrate, heat exchanger heat transfer area, flow area and hydraulic diameter and valve loss characteristic as a function of open fraction.

Thus, the simulation model generating method and apparatus according to at least some example embodiments, provide the ability correlate and transfer data, and thus, provide the ability to automate the development of most of the simulation model.

The values of the "ID" array element and "NozID" array elements of the array shown in Table 1 that corresponds to the Filter-0121 component are illustrated as the unique identification values read from the "ID" attributes of the "Equipment" element and nozzle sub elements that describe the Filter-0121 component within the XML file 400. However, according to at least one example embodiment, when generating the array shown in Table 1 in operation S215, the simulation model generating apparatus 200 may assign a different 4-digit value (e.g., "0001") to each of several different unique identification value read from an "ID" attribute of an element or sub-element. For example, the simulation model generating apparatus 200 may start with the 4-digit value "0001" and increment the 4-digit value, for example, by 1, for every new unique identification value corresponding to every ID array element of every component array generated by the simulation model generating apparatus 200.

For example, in a scenario where the array illustrated in Table 1 is the first array generated by the simulation model generating apparatus 200, the simulation model generating apparatus 200 may start by assigning the 4-digit value "0001" to the "ID" attribute of the "Equipment" element illustrated in FIG. 4. Further, the simulation model generating apparatus 200 may sequentially assign the values "0002," "0003," "0004," and "0005" to the 4 unique identifier values read from the 4 "ID" attributes of the 4 "Nozzle" sub-elements of the "Equipment" element illustrated in FIG. 4. When the simulation model generating apparatus generates the arrays (e.g., the array shown in Table 1) in operation S215, the simulation model generating apparatus 200 may use the 4-digit values as values of array elements in place of the unique identifier values to which the 4-digit values are assigned.

Further, in operation S215, the simulation model generating apparatus 200 may also store a correspondence table defining the correspondence between the unique identifier value stored in the "ID" attribute or an element or sub-element, and the 4-digit value generated the simulation model generating apparatus 200 that corresponds to the unique identifier. Thus, according to at least some example embodiments, the simulation model generating apparatus 200 can check the correspondence table to see if a 4-digit value has already been assigned to a unique identifier, and avoid generating a new 4-digit value for unique identifiers to which the simulation model generating apparatus 200 has already assigned a 4-digit value. Though 4-digit values are discussed above as an example, the operations described above with respect to the 4-digit values may be applied to any desired number of digits including, for example, 3-digit values, 5-digits values and 6-digit values.

According to at least some example embodiments, in operation S215, the simulation model generating apparatus 200 adds each of the generated arrays to at least one of a plurality of array lists, and stores the array lists, for example, in storage unit 256. Examples of different types of array lists will be discussed in greater detail below with reference to FIG. 5.

Though operations S210 and S215 are illustrated as separate steps, according to at least some example embodiments, the simulation model generating apparatus 200 may perform operations S210 and S215 as a single step or separate steps.

Returning to FIG. 2, in operation S220, a simulation model is generated based on the information describing the identified components. For example, in operation S220, the simulation model generating apparatus 200 may generate a simulation model based on the information describing the identified components that was stored by the simulation model generating apparatus 200 in operation S215.

According to at least some example embodiments, in operation S220, the simulation model generating apparatus 200 creates a simulation model file corresponding to a desired simulation modeling software environment. The desired simulation modeling software environment may be chosen, for example, in accordance with the preference of a simulation engineer or user performing a method in accordance with any of FIGS. 2-8. Further, the simulation model generating apparatus 200 reads the arrays that were created and stored by the simulation model generating apparatus 200 in operation 215. Further, for each array read, the simulation model generating apparatus 200 may generate a corresponding description of a component using the syntax of the desired simulation modeling software environment, and add the description to the simulation model file. The resulting simulation model file may define a simulation model.

Consequently, in operation S220, the simulation model generating apparatus 200 generates a simulation model by building the generation model file in the manner discussed above. Further, the simulation model generated in operation S220 may then be used by the simulation model generating apparatus 200 or a different apparatus to perform various types of simulations within the desired simulation modeling software environment. Further, the simulation model generated in operation S220 may correspond or substantially correspond to the PID that was exported as the XML file received in operation S205, without the need for a simulation engineer to create the simulation model by manually entering, into the simulation model, each component and interconnection included in the PID. Consequently, an amount of time associated with creating a simulation model that corresponds to a PID may be decreased significantly.

More detailed explanations of operations S210~S220, according to at least some example embodiments, are discussed below with respect to FIGS. 5-7.

Figure 5:
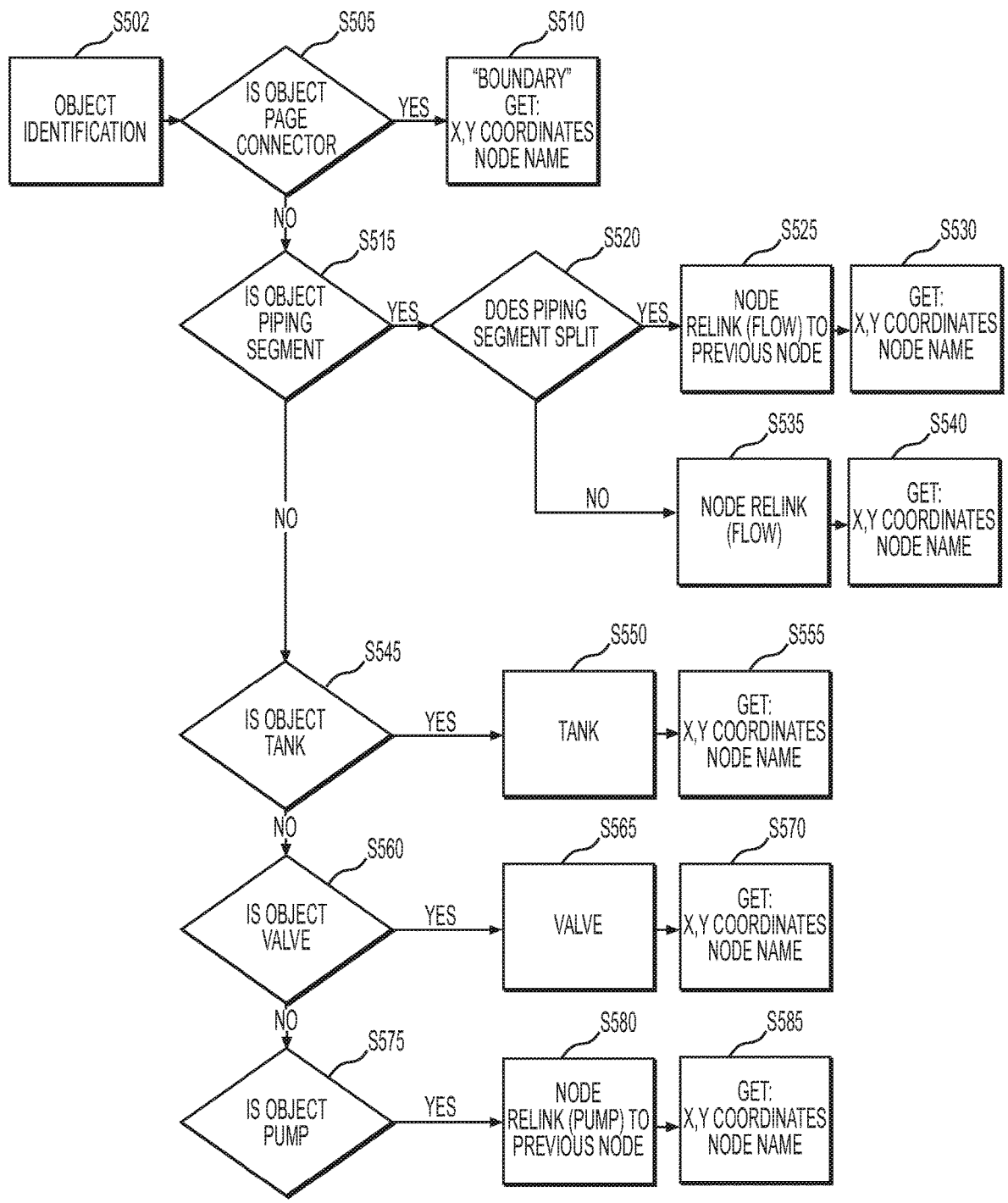
FIG. 5 illustrates a method of performing object identification according to at least some example embodiments.

FIG. 5 illustrates a method of performing object (i.e., component) identification according to at least some example embodiments. According to at least some example embodiments, operation S210 may be performed in accordance with FIG. 5. According to at least some example embodiments, operations S210 and S215 may be performed in accordance with FIG. 5.

Figure 6:
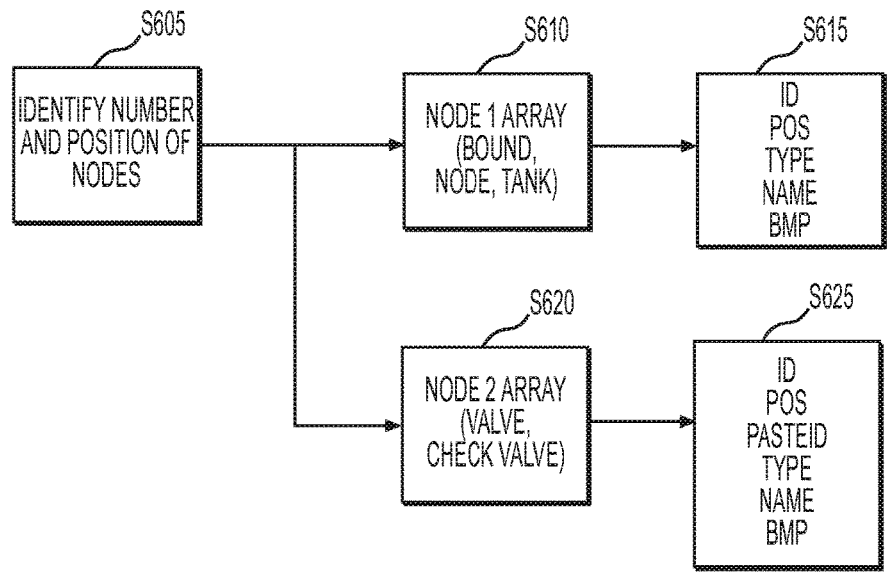
FIGS. 6 and 7 are flow charts for illustrating a method of generating a simulation model file according to at least some example embodiments.
Figure 7:
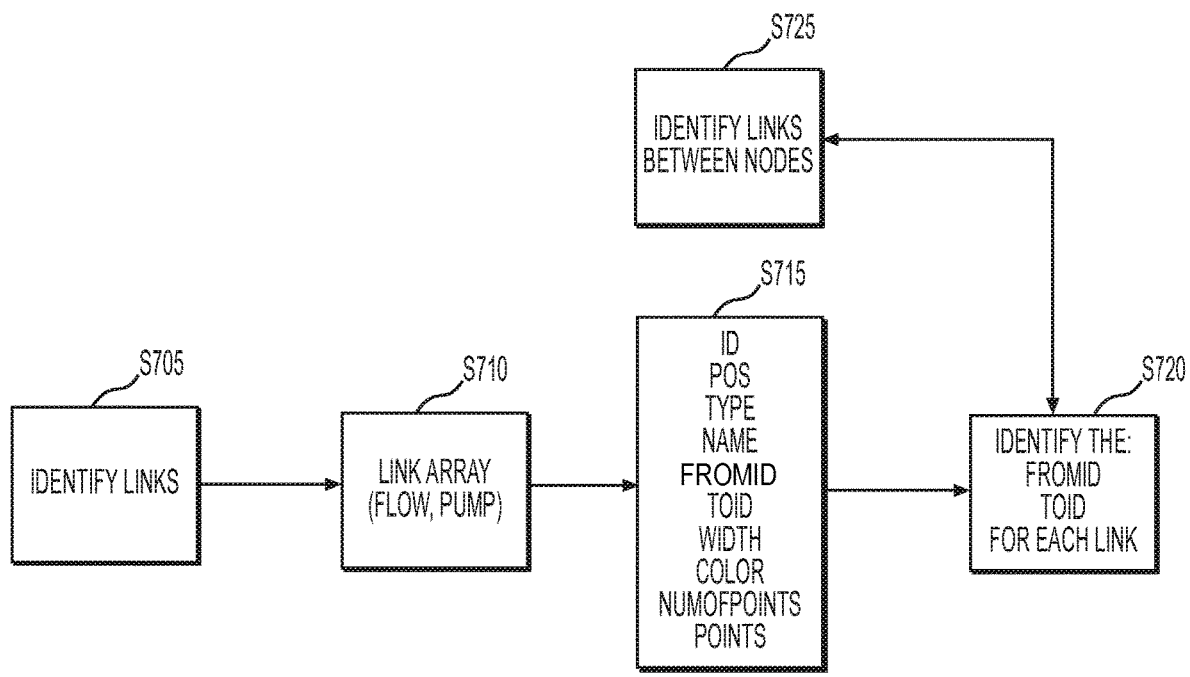

FIGS. 5-7 will be described with reference to a scenario in which (i) the XML file received in operation S205 represents piping segments as components, and (ii) according to the syntax of the simulation model file generated in step S220, piping segments are represented as links that originate at a first node and terminate at a second node, and each link may be a pump link or a flow link. An example of the above-referenced scenario includes an operation of the simulation model generating apparatus 200 generating a simulation model file using the syntax of a simulation platform simulation model based on an XML file exported from a PID by SmartPlant® P&ID software. Examples of different simulation platforms this apparatus applies to include Modelica, MATLAB™, 3KEYMASTER™, JADE™. In accordance with the syntax of a 3KEYMASTER™ simulation platform simulation model, some components (e.g., tanks, filters, valves, check valves, and page connectors) are defined as nodes, and some components (e.g., pipe segments and pumps) are defined as links. Accordingly, with respect to the description of FIGS. 5-7 below, arrays generated by the simulation model generating apparatus 200 for nodes may be referred to as node arrays, and arrays generated by the simulation model generating apparatus 200 for links may be referred to as link arrays.

However, according to at least some example embodiments, the simulation model generating apparatus 200 is not limited to generating simulation models that have the syntax of a specific simulation platform simulation model, and the simulation model generating apparatus 200 is not limited to using XML files that are exported from PIDs by a specific P&ID CAD software.

Referring to FIG. 5, in operation S502 an object (i.e., component) identification operation is initiated for a component included in the XML file received in operation S205 of FIG. 2. For example, in operation S502, the simulation model generating apparatus 200 may read an element or sub-element defining a component from the XML file received in operation S205 of FIG. 2.

In operation S505, the simulation model generating apparatus 200 determines whether the component defined by the element or sub-element read in operation S502 is a page connector. For example, according to at least some example embodiments, in operation S505, the simulation model generating apparatus 200 may determine whether the component defined by the element or sub-element read in operation S502 is a page connector by determining whether a "ComponentName" attribute of the component defined by the element or sub-element read in operation S502 has a value corresponding to a page connector component.

If the simulation model generating apparatus 200 determines, in operation S505, that the component defined by the element or sub-element read in operation S502 is a page connector, the simulation model generating apparatus 200 proceeds to operation S510.

In operation S510, the simulation model generating apparatus 200 extracts information defining the page connector component from the XML file received in operation S205 of FIG. 2, and stores the extracted information. For example, the simulation model generating apparatus 200 may generate an array corresponding to the page connector component in the same manner discussed above with respect to operation S215 of FIG. 2 and the array illustrated in Table 1. For example, the array generated for the page connector component may include array elements for at least position information, component name information, and ID information of the page connector component. Further, in operation S510, the simulation model generating apparatus 200 may store the array corresponding to the page connector component in one of a plurality of array lists.

According to at least one example embodiment, the simulation model generating apparatus 200 may create an on-link node array list, an endpoint node array list, and a link array list. The on-link node array list may store arrays corresponding to components that are defined as nodes that are placed on top of links in accordance with the design rules of the desired simulation modeling software environment. Examples of types of components that correspond to the arrays included in the on-link node array list in accordance with the design rules of some simulation platforms (e.g., 3KEYMASTER™) include, for example, valve components and check valve components. The endpoint node array list may store arrays corresponding to components that can act as origin or termination nodes of a link in accordance with the design rules of the desired simulation modeling software environment. Examples of types of components that correspond to the arrays included in the endpoint node array list in accordance with the design rules of some simulation platforms (e.g., 3KEYMASTER™) include, for example, tank components and filter components. The link array list may store arrays corresponding to components that are defined as links in accordance with the design rules of the desired simulation modeling software environment. Examples of types of components that correspond to arrays included in the link array list in accordance with the design rules of some simulation platforms (e.g., 3KEYMASTER™) include, for example, pump components and piping segment components. Alternatively, the simulation platform may use a different scheme of simulating fluid systems, including, for example, a scheme in which, instead of pumps being defined as a link between nodes, a pump would be a component that would be between two nodes. Further, a valve or check valve could also be simulated in a different manner. For example, instead of the valve or check valve being placed on a flow link, the valve or check valve could be a component that is connected from one portion of the flow link to another portion of the flow link, or connected between 2 flow links.

If the simulation model generating apparatus 200 determines, in operation S505, that the component defined by the element or sub-element read in operation S502 is not a page connector, the simulation model generating apparatus 200 proceeds to operation S515.

In operation S515, the simulation model generating apparatus 200 determines whether the component defined by the element or sub-element read in operation S502 is a piping segment. For example, according to at least some example embodiments, in operation S515, the simulation model generating apparatus 200 may determine whether the component defined by the element or sub-element read in operation S502 is a piping segment by determining whether a "ComponentName" attribute of the component defined by the element or sub-element read in operation S502 has a value corresponding to a piping segment component.

If the simulation model generating apparatus 200 determines, in operation S515, that the component defined by the element or sub-element read in operation S502 is a piping segment, the simulation model generating apparatus 200 proceeds to operation S520.

In operation S520, the simulation model generating apparatus 200 determines whether the piping segment splits (e.g., branches).

If, in operation S520, the simulation model generating apparatus 200 determines that the piping segment splits, the simulation model generating apparatus 200 proceeds to operation S525.

In operation S525, the simulation model generating apparatus 200 may generate and store multiple arrays defining multiple links. For example, if a piping segment originates at a first node and branches into two pipes that connect to second and third nodes, respectively, the simulation model generating apparatus 200 may generate and store a node array corresponding to a new fourth node located at the point where the two pipes split. The simulation model generating apparatus 200 may generate and store a first link array defining a first link as originating at the first node and terminating at the new fourth node. The simulation model generating apparatus 200 may generate and store a second link array defining a second link as originating at the new fourth node and terminating at the second node. Further, the simulation model generating apparatus 200 may generate and store a third link array defining a third link as originating at the new fourth node and terminating at the third node.

In operation S530, the simulation model generating apparatus 200 may extract node name and/or ID value and node position values from the XML file received in operation S205 of FIG. 2, and populate array elements of the first, second and third link arrays generated in operation S525 with corresponding node name and/or ID values and node position values. For example, the element or sub-element in the XML file that defines the piping segment component identified by the simulation modeling apparatus in operation S515 may also include, for example, a "FromID" value identifying an origin node of the piping segment and one or more "ToID" values identifying one or more termination nodes of the piping segment. The "FromID" and "ToID" values may be, for example, attributes of a "Connection" sub-element of a "PipingNetworkSegment" element of the XML file that defines the piping segment identified in operation S515. Accordingly, in operation S530, the simulation model generating apparatus 200 can create or populate array elements that specify link origin nodes and link termination nodes for each of the first, second and third link arrays. According to at least some example embodiments, each of the first, second and third nodes may be, for example, components for which arrays have already been generated by the simulation model generating apparatus 200. Accordingly, the simulation model generating apparatus 200 may refer to the arrays corresponding to the first, second and third nodes in order to acquire the position information of the first, second and third nodes that may be included as values for position array elements of the first, second and third link arrays. According to at least some example embodiments, the simulation model generating apparatus 200 placed node arrays corresponding to the first, second and third nodes in the endpoint node array list, for example, when the simulation model generating apparatus 200 created the arrays corresponding to the first, second and third nodes.

According to at least some example embodiments, in operation S530, the simulation model generating apparatus 200 may store the first, second, and third link arrays in the link array list, and may store the node array defining the new fourth node in the endpoint node array list.

If, in operation S520, the simulation model generating apparatus 200 determines that the piping segment does not split, the simulation model generating apparatus 200 proceeds to operation S535.

In operation S535, the simulation model generating apparatus 200 may generate and store a link array defining a link corresponding to the piping segment identified by the simulation model generating apparatus 200 in operation S515.

In operation S540, the simulation model generating apparatus 200 may extract node name and/or ID value and node position values from the XML file received in operation S205 of FIG. 2, and populate array elements of the link array generated in operation S535 using, for example, a "FromID" value identifying an origin node of the piping segment and a "ToID" values identifying one or more termination nodes of the piping segment. The "FromID" and "ToID" values may be, for example, attributes of a "Connection" sub-element of a "PipingNetworkSegment" element of the XML file that defines the piping segment identified in operation S515.

In accordance with the design rules of the simulation platform, there can be different types of links including, for example, flow links and pump links. According to at least some example embodiments, pump links may differ from flow links in that a pump link describes a link to which a pumping force is applied. According to at least some example embodiments, each of the links described above with respect to operations S525-S540 may be a flow links. Examples of pump links are described below with reference to steps S580 an S585.

If the simulation model generating apparatus 200 determines, in operation S515, that the component defined by the element or sub-element read in operation S502 is not a piping segment, the simulation model generating apparatus 200 proceeds to operation S520.

In operation S545, the simulation model generating apparatus 200 determines whether the component defined by the element or sub-element read in operation S502 is a tank. For example, according to at least some example embodiments, in operation S545, the simulation model generating apparatus 200 may determine whether the component defined by the element or sub-element read in operation S502 is a tank by determining whether a "ComponentName" attribute of the component defined by the element or sub-element read in operation S502 has a value corresponding to a tank component.

If the simulation model generating apparatus 200 determines, in operation S545, that the component defined by the element or sub-element (of Component Class or Component Name) read in operation S502 is a tank, (or accumulator, drum or vessel) the simulation model generating apparatus 200 proceeds to operation S550.

In operation S550, the simulation model generating apparatus 200 generates and stores a node array corresponding to the tank component identified in operation S545.

In operation S555, the simulation model generating apparatus 200 extracts information defining the tank component from the XML file received in operation S205 of FIG. 2, and stores the extracted information in the node array generated in operation S550. For example, the simulation model generating apparatus 200 may generate an array corresponding to the tank component in the same manner discussed above with respect to operation S215 of FIG. 2 and the array illustrated in Table 1. For example, the array generated for the tank component may include array elements for at least position information, component name information, and ID information of the tank component. Further, in operation S555, the simulation model generating apparatus 200 may store the array corresponding to the tank component in the endpoint node array list.

If the simulation model generating apparatus 200 determines, in operation S545, that the component defined by the element or sub-element read in operation S502 is not a tank component, the simulation model generating apparatus 200 proceeds to operation S560.

In operation S560, the simulation model generating apparatus 200 determines whether the component defined by the element or sub-element read in operation S502 is a valve. For example, according to at least some example embodiments, in operation S545, the simulation model generating apparatus 200 may determine whether the component defined by the element or sub-element read in operation S502 is a valve by determining whether a "ComponentName" attribute of the component defined by the element or sub-element read in operation S502 has a value corresponding to a valve component.

If the simulation model generating apparatus 200 determines, in operation S560, that the component defined by the element or sub-element read in operation S502 is a valve, the simulation model generating apparatus 200 proceeds to operation S565.

In operation S565, the simulation model generating apparatus 200 generates and stores a node array corresponding to the valve component identified in operation S560.

In operation S570, the simulation model generating apparatus 200 extracts information defining the valve component from the XML file received in operation S205 of FIG. 2, and stores the extracted information in the node array generated in operation S565. For example, the simulation model generating apparatus 200 may generate a node array corresponding to the valve component in the same manner discussed above with respect to operation S215 of FIG. 2 and the array illustrated in Table 1. For example, the array generated for the valve component may include array elements for at least position information, component name information, and ID information of the valve component. Additionally, for valves (as well as check valves and other on-link type components), the generated node array may further include information extracted from the XML file 400 that identifies connection points of the valve or other components to which the valve is connected (e.g., "FromID" and "ToID" attributes). Further, in operation S570, the simulation model generating apparatus 200 may store the node array corresponding to the valve component in the on-link node array list.

If the simulation model generating apparatus 200 determines, in operation S560, that the component defined by the element or sub-element read in operation S502 is not a valve component, the simulation model generating apparatus 200 proceeds to operation S575.

In operation S575, the simulation model generating apparatus 200 determines whether the component defined by the element or sub-element read in operation S502 is a pump. For example, according to at least some example embodiments, in operation S575, the simulation model generating apparatus 200 may determine whether the component defined by the element or sub-element read in operation S502 is a pump by determining whether a "Component-Name" or "Name" attribute of the component defined by the element or sub-element read in operation S502 has a value corresponding to a pump component.

If the simulation model generating apparatus 200 determines, in operation S575, that the component defined by the element or sub-element read in operation S502 is a pump, the simulation model generating apparatus 200 proceeds to operation S580.

In operation S580, the simulation model generating apparatus 200 generates and stores a link array corresponding to the pump component identified in operation S560.

In operation S585, the simulation model generating apparatus 200 extracts information defining the pump component from the XML file received in operation S205 of FIG. 2, and stores the extracted information in the link array generated in operation S580. For example, the simulation model generating apparatus 200 may generate a link array corresponding to the pump component in the same manner discussed above with respect to operation S215 of FIG. 2 and the array illustrated in Table 1. For example, the link array generated for the pump component may include array elements for at least position information of the pump component, component name information of the pump component, and ID information of the pump component. Additionally, the link array generated for the pump component may define a pump link. Further, in operation S570, the simulation model generating apparatus 200 may store the link array corresponding to the pump component in the link array list.

According to at least some example embodiments, in operation S585, the simulation model generating apparatus 200 may store the link array generated in operation S580 in the link array list.

Referring to FIG. 5, if the simulation model generating apparatus 200 does not identify the component defined by the element or sub-element read in operation S502, the simulation model generating apparatus 200 may return to step S502, read a new element or sub-element from the XML file received in operation S205 of FIG. 2, and attempt to identify a component defined by the new element or sub-element in accordance with steps S505-S585.

The various component types described with respect to FIG. 5 (e.g., page connector, piping segment, tank, valve, and pump) are provided as examples. The simulation model generating apparatus 200 is not limited to identifying the component defined by the element or sub-element read in operation S502 as one of the component types described with respect to FIG. 5. According to at least some example embodiments, the simulation model generating apparatus 200 is further capable of identifying additional component types including, for example, filter component types and check valve component types, which can be processed according to the methods described for tanks and valves, respectively.

FIGS. 6 and 7 are flow charts for illustrating a method of generating a simulation model file according to at least some example embodiments. FIG. 6 describes an example of a manner in which the node arrays generated in the object identification method described above with respect to FIG. 5 are used to generate the simulation model file. FIG. 7 describes an example of a manner in which the link arrays generated in the method described above with respect to FIG. 5 are used to generate the simulation model file.

Referring to FIG. 6, in operation S605, the simulation model generating apparatus 200 may create a simulation model file in accordance with the file format of the desired simulation modeling software environment, and identify a numbers and positions of the components described by the node arrays discussed above with respect to FIG. 5. Operation S605 may include two sub-operations, S610 and S620.

In operation S610, the simulation model generating apparatus 200 may read the information stored in node arrays listed in the endpoint node list discussed above with respect to FIG. 5. In operation S615, the simulation model generating apparatus 200 may use the information read in operation S610 to generate descriptions of each of the components corresponding to the node arrays listed in the endpoint node list, using the syntax of the desired simulation modeling software environment. The simulation model generating apparatus 200 may add each of the descriptions generated in operation S615 to the simulation model file created in operation S605, thereby defining, in the simulation model file, node objects using the syntax of the desired simulation modeling software environment. Thus, according to at least some example embodiments, each node object defined in the simulation model file in operation S615 may correspond to an endpoint node array included in the endpoint node array list described above with respect to FIG. 5.

As is illustrated in FIG. 6, according to at least some example embodiments, the node objects defined in the simulation model file by the simulation model generating apparatus 200 in operation S615 may each include an ID value "ID," a position value "Pos," a type value "Type," a name value "Name," and graphic information "BMP."

According to at least some example embodiments, the node objects defined in the simulation model file by the simulation model generating apparatus 200 in operation S615 may each include, as an identifier (e.g., "ID") value, a unique 4-digit integer. Further, the unique 4-digit integers included in the definitions of the node objects added to the simulation model file in operation S615 may be the unique 4-digit integers assigned to the components for which the endpoint node arrays corresponding to the node objects were generated. Examples of generating the unique 4-digit integers for component arrays are discussed above with respect to Table 1. Similarly, component tag names included in the definitions of the node objects added to the simulation model file in operation S615 may be or include the tag names of the components for which the endpoint node arrays corresponding to the node objects were generated.

In operation S615, for each node object being defined in the simulation model file, the simulation model generating apparatus 200 may determine the position value "Pos" of the node object based on the position information (e.g., coordinates) included in the endpoint node array to which the node object corresponds, determine the type value "Type" of the node object based on the type information (e.g., type=tank or page connector) included in the endpoint node array to which the node object corresponds, determine the name value "Name" of the node object based on the name information (e.g., a tag name) included in the endpoint node array to which the node object corresponds, and determine the graphic information "BMP" of the node by providing a link to an image file (e.g., a bitmap) that corresponds to the type information determined for the node object.

According to at least some example embodiments, before performing operation S620, the simulation model generating apparatus 200 may proceed to the method illustrated in FIG. 7.

Referring to FIG. 7, in operation S705, the simulation model generating apparatus 200 identifies links.

According to at least some example embodiments, operation S710 is a sub-operation of operation S705. In operation S710, the simulation model generating apparatus 200 may access link arrays that define corresponding components by reading the link array list described above with respect to FIG. 5.

In step S715, the simulation model generating apparatus 200 may read the information stored in each of the link arrays listed in the link array list.

In operation S720, the simulation model generating apparatus 200 may identify "FromID" and "ToID" information included in the information read from each of the link arrays in operation S715. In operation S725, based on the "FromID" and "ToID" information identified in operation S720, the simulation model generating apparatus 200 may determine, for each link defined by a link array included in the link array list, the nodes that act as endpoints for the link, and may generate descriptions of each of the links using the syntax of the desired simulation modeling software environment. The simulation model generating apparatus 200 may add each of the descriptions generated in operation S725 to the simulation model file created in operation S605, thereby defining, in the simulation model file, link objects using the syntax of the desired simulation modeling software environment.

As is illustrated in FIG. 7, according to at least some example embodiments, the link objects defined in the simulation model file by the simulation model generating apparatus 200 in operation S725 may each include an ID value "ID," a position value "Pos," a type value "Type," a name value "Name," the "FromID" and "ToID" values, width and color values Width and Color, a "NumOfPoints" information item and a "Points" information item.

According to at least some example embodiments, the node objects defined in the simulation model file by the simulation model generating apparatus 200 in operation S725 may each include, as an identifier (e.g., "ID") value, a unique 4-digit integer. Further, the unique 4-digit integers included in the definitions of the link objects added to the simulation model file in operation S725 may be the unique 4-digit integers assigned to the components for which the link arrays corresponding to the link objects were generated. Examples of generating the unique 4-digit integers for component arrays are discussed above with respect to Table 1. Similarly, component tag names included in the definitions of the link objects added to the simulation model file in operation S725 may be or include the tag names of the components for which the link arrays corresponding to the link objects were generated.

In operation S720, for each link object being defined in the simulation model file, the simulation model generating apparatus 200 may determine the position value "Pos" of the link object based on the position information (e.g., coordinates) included in the link array to which the link object corresponds, determine the type value "Type" of the link object based on the type information (e.g., type=pump link or flow link) included in the link array to which the link object corresponds, determine the name value "Name" of the link object based on the name information (e.g., a tag name) included in the link array to which the link object corresponds, determine the "FromID" and "ToID" values of the link object based on FromID and ToID information (e.g., the FromID and ToID information discussed above with reference to operation S535) included in the link array to which the link object corresponds, and determine the "Color" and "Width" values of the link object based on color and width information included in the link array to which the link object corresponds. Further, in operation S720, for each link object being defined in the simulation model file, the simulation model generating apparatus 200 may use the attribute information read from the link arrays in operation S715 to generate the "NumOfPoints" item, which contains information items identifying a number of points through which the corresponding link will be routed, and generate the "Points" item, which contains information identifying coordinates of each of the points through which the corresponding link will be routed.

Thus, according to at least some example embodiments, each link object defined in the simulation model file in operation S725 may correspond to a link array included in the link array list described above with respect to FIG. 5. According to at least some example embodiments, the link objects defined in the simulation model file by the simulation model generating apparatus 200 in operation S725 may each include, as an identifier (e.g., "ID") value, a unique 4-digit integer. Further, the unique 4-digit integers included in the definitions of the link objects in the simulation model file may be the unique 4-digit integers assigned to the components for which the link arrays corresponding to the link objects were generated. Examples of generating the unique 4-digit integers for component arrays are discussed above with respect to Table 1. Similarly, component tag names included in the definitions of the link objects in the simulation model file may be or include the tag names of the components for which the link arrays corresponding to the link objects were generated.

Further, the link objects defined in the simulation model file by the simulation model generating apparatus 200 in operation S725 can represent connections between 2 nodes and can each be either a pump link or a flow link. The pump link is a link that adds energy (flow) to the system being modeled by the simulation modeling software environment. A flow link passes energy in the system being modeled by the simulation modeling software environment.

According to at least some example embodiments, after performing operation S725, the simulation model generating apparatus 200 may return to the method illustrated in FIG. 6.

Returning to FIG. 6, in operation S620, the simulation model generating apparatus 200 may read the information stored in node arrays listed in the on-link node list discussed above with respect to FIG. 5. In operation S625, the simulation model generating apparatus 200 may use the information read in operation S620 to generate descriptions of each of the node objects corresponding to the node arrays listed in the on-link node list, using the syntax of the desired simulation modeling software environment. The simulation model generating apparatus 200 may add each of the descriptions generated in operation S625 to the simulation model file created in operation S605, thereby defining, in the simulation model file, node objects using the syntax of the desired simulation modeling software environment. Thus, according to at least some example embodiments, each node object defined in the simulation model file in operation S625 may correspond to an on-link node array included in the on-link node array list described above with respect to FIG. 5.

As is illustrated in FIG. 6, according to at least some example embodiments, the node objects defined in the simulation model file by the simulation model generating apparatus 200 in operation S625 may each include an ID value "ID," a position value "Pos," a paste ID value "PasteID," a type value "Type," a name value "Name," and graphic information "BMP."

According to at least some example embodiments, the node objects defined in the simulation model file by the simulation model generating apparatus 200 in operation S625 may each include, as an identifier (e.g., "ID") value, a unique 4-digit integer. Further, the unique 4-digit integers included in the definitions of the node objects in the simulation model file may be the unique 4-digit integers assigned to the components for which the on-link node arrays corresponding to the node objects were generated. Examples of generating the unique 4-digit integers for component arrays are discussed above with respect to Table 1. Similarly, component tag names included in the definitions of the node objects added to the simulation model in operation S625 file may be or include the tag names of the components for which the on-link node arrays corresponding to the node objects were generated.

In operation S625, for each node object being defined in the simulation model file, the simulation model generating apparatus 200 may determine the position value "Pos" of the node object based on the position information (e.g., coordinates) included in the on-link node array to which the node object corresponds, determine the type value "Type" of the node object based on the type information (e.g., type=valve or check valve) included in the on-link node array to which the node object corresponds, determine the name value "Name" of the node object based on the name information (e.g., a tag name) included in the on-link node array to which the node object corresponds, and determine the graphic information BMP of the node by providing a link to an image file (e.g., a bitmap) that corresponds to the type information determined for the node object. Further, in operation S625, for each node object being defined in the simulation model file in operation S625, the simulation model generating apparatus 200 may set the paste ID value "PasteID" as the ID of the link, identified in operation S560, that the node object (e.g., valve or check valve) is placed inline of (or on top of).

As was noted above, FIGS. 5-7 were described with reference to a scenario in which (i) the XML file received in operation S205 represents piping segments as objects, and (ii) according to the syntax of the simulation model file generated in step S220, piping segments are represented as links that originate at a first node and terminate at a second node, and each link may be a pump link or a flow link.

However, according to at least some example embodiments, if the XML file received in operation S205 and the syntax of the simulation model file generated in step S220 both describe piping segments using links, or both describe piping segments as objects that can have more than two branches, operation S520-S530 in FIG. 5 may be omitted, and the simulation model generating apparatus 200 may proceed directly from operation S515 to operation S535, when the object is determined to be a piping segment in operation S515.

Further, if, according to the syntax of the simulation model file generated in step S220, pumps are described as node objects instead of link objects, a node array may be created for the pump object in operation S580 instead of a link array.

Further, if, according to the syntax of the simulation model file generated in step S220, on-link nodes are treated as endpoints in the same manner as endpoint nodes, operations S620 and S625 in FIG. 6 may be omitted, and all node objects (including valves and check valves) may be handled by the simulation model generating apparatus 200 in accordance with operation S610 and S615.

Figure 8:
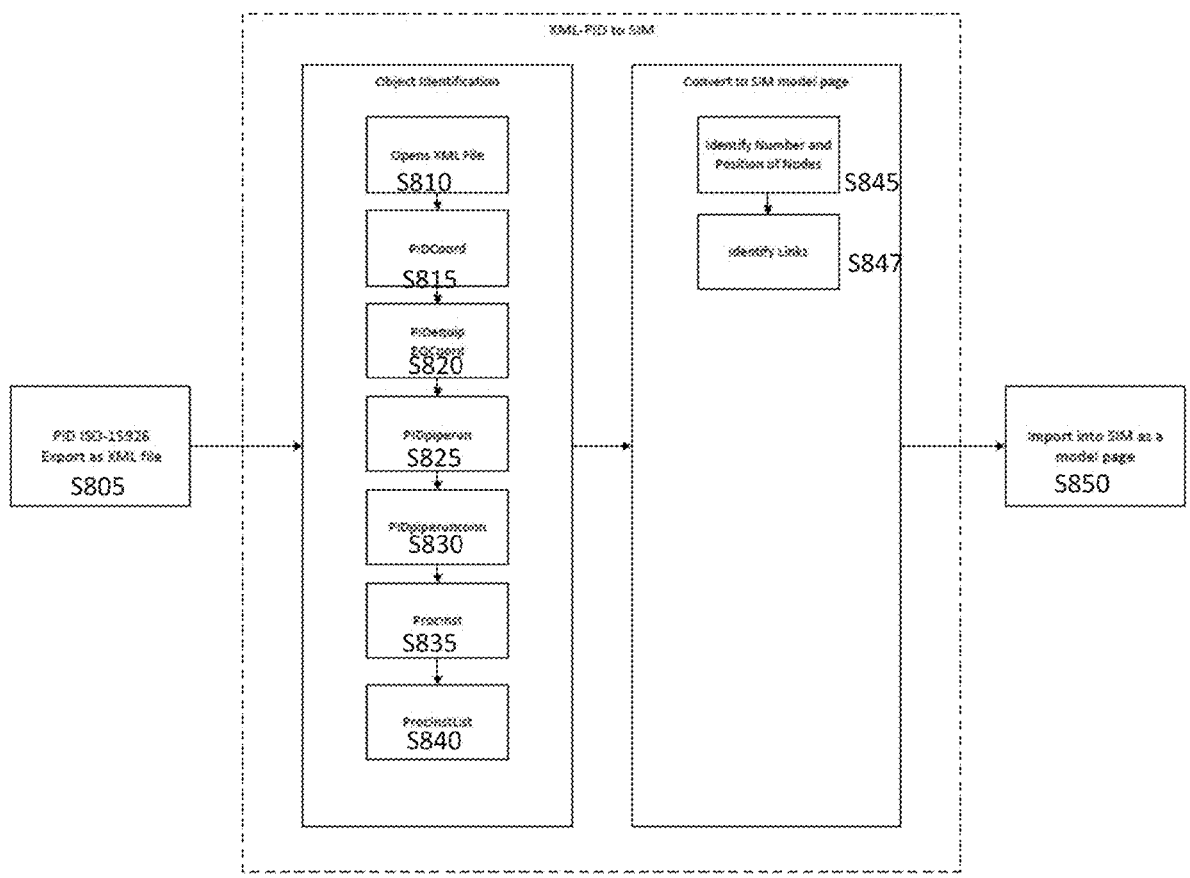
FIG. 8 is a flow chart illustrating an example of a simulation model generating method.

FIG. 8 is a flow chart illustrating an example of a simulation model generating method. The simulation modeling method of FIG. 8 may be performed by the simulation model generating apparatus 200. The simulation modeling method of FIG. 8 may include receiving and opening an XML file corresponding to a PID of a system, as is described in greater detail below with reference to operations S805 and S810. The XML file may include information about attributes of the PID and information about attributes of components of the system. The simulation modeling method of FIG. 8 may further include extracting the information about the attributes of the PID and storing the extracted information about the attributes of the PID, as is discussed in greater detail below with reference to operation S815. The simulation modeling method of FIG. 8 may further include identifying components of the system that are described in the XML file, extracting information about the attributes of the identified components from the XML file, and storing the extracted information about the attributes of the identified components, as is discussed in greater detail below with reference to operations S820-S840. The simulation modeling method of FIG. 8 may further include generating a simulation model page using syntax of a desired simulation modeling software environment, based on the stored information about the attributes of the identified components, as is discussed in greater detail below with reference to operation S850.

In operation S805, the simulation model generating apparatus 200 receives an XML file. The simulation model generating apparatus may perform operation S805 in the same manner as that discussed above with respect to operation S205 of FIG. 2. As an example, FIG. 8 will be explained with respect to a scenario in which the simulation model generating apparatus receives the XML file 400 of FIG. 4 in operation S805. According to at least some example embodiments, PID generating software used to create or access a PID of a system may export the PID of the system in the form of the XML file received by the simulation model generating apparatus 200 in operation S805. FIG. 8 will be explained with reference to a scenario in which, the PID 300 of FIG. 3 is exported, by the PID generating software used to create or access the PID 300, as the XML file 400 received by the simulation model generating apparatus 200 in operation S805. According to at least some example embodiments, the XML file 400 follows PID XML Standard ISO 15926.

In operation S810, the simulation model generating apparatus 200 opens the XML file received in operation S805 in order to access the contents of the received XML file. For example, in operation S810, the simulation model generating apparatus 200 opens the XML file 400.

In operation S815, the simulation model generating apparatus 200 extracts, from the received XML file, dimensions of the PID corresponding to the received XML file, and stores the extracted information in a data structure referred to, herein, as a PIDcoord list. According to at least some example embodiments, the simulation model generating apparatus 200 may generate the PIDcoord list by searching through the XML file 400, finding the element that lists the dimensions of the PID 300, creating an array or object data structure that stores the dimensions of the PID 300 listed in the XML file 400, and storing the created array or object in the PIDcoord list. For example, the simulation model generating apparatus 200 may extract "X" and "Y" attributes of "Min" and "Max" sub-elements of an "Extent" sub-element of a "Drawing" element included in the XML file 400, and store the extracted elements as PID coordinate object in the PIDcoord list. If an XML file includes information exported from more than one PID, the simulation model generating apparatus 200 may create a PID coordinate object for each PID represented in the XML file, the PIDcoord list may include each of the create PID coordinate objects.

In operation S820, the simulation model generating apparatus 200 extracts, from the received XML file, information about equipment components described in the XML file, and stores the extracted information in a data structure referred to, herein, as a EQcoord list. The EQcoord list may be generated based on a data structure referred to, herein, as a PIDequip list in a manner that will now be discussed in greater detail below.

For example, according to at least some example embodiments, in operation S820, the simulation model generating apparatus 200 searches through the XML file 400, and finds each "Equipment" element listed in the XML file 400. Further, according to at least some example embodiments, in operation S820, for each "Equipment" element found in the XML file 400, the simulation model generating apparatus 200 extracts attribute information about the "Equipment" element from the XML file 400, creates a component object data structure which includes elements corresponding to the attributes of the "Equipment" element extracted from the XML file, and stores the created component object in the PIDequip list. According to at least some example embodiments, the structure of the component array shown in Table 1 discussed above with reference to operations S210 and S215 of FIG. 2 is an example of the structure of the component objects the simulation model generating apparatus 200 creates for each "Equipment" element found in the XML file 400 in operation S820. For example, according to at least some example embodiments, each component object created by the simulation model generating apparatus 200 in operation S820 may be created in the same manner as that described above with respect to operations S210 and S215, and the component array shown in Table 1.

Further, in operation S820, the simulation model generating apparatus 200 may convert the attributes included in each of the component objects included in the PIDequip list into a series of strings, and store the series of strings in the EQcoord list along with text identifying the attributes included in each string.

One of the attributes included in each of the component objects is the ID attribute, which may be, for example, a 32-hexadecimal number identifier that uniquely identifies the component for which the component object was created. Some component objects further include ID attributes that identify sub-components of the component for which the component object was created (e.g., the nozzle IDSs of nozzles included in a filter component shown in FIG. 4). In operation S820, for each component object included in the PIDequip list, the simulation model generating apparatus 200 may read the 32-hexadecimal number identifier of the component object (and the 32-hexadecimal number identifiers of any corresponding sub-components), and convert the unique 32-hexadecimal number identifiers into n-digit unique identifier, where 'n' is a positive integer. For example, the simulation model generating apparatus 200 may read the 32-hexadecimal number identifier of each component object included in the PIDequip list, and convert the unique 32-hexadecimal number identifier into a 4-digit unique identifier (e.g., a unique identifier that is a 4-digit decimal (i.e., base-10) number). According to at least some example embodiments, the simulation model generating apparatus 200 may start with the 4-digit value "0001" and increment the 4-digit value, for example, by 1, for every new unique identification value corresponding to every unique 32-hexadecimal number identifier of every component object generated by the simulation model generating apparatus 200. According to at least some example embodiments, the simulation model generating apparatus 200 may generate the EQcoord list in operation S820 by storing the unique 4-digit values generated in operation S820 in the EQcoord list as unique IDs corresponding to each of the component objects and sub-components of the PIDequip list, in place of the 32-hexadecimal number identifiers from which the unique 4-digit values were converted.

In operation S825, the simulation model generating apparatus 200 extracts, from the received XML file, information about piping network components described in the XML file, and stores the extracted information in a data structure referred to, herein, as a PIDpiperun list.

For example, according to at least some example embodiments, in operation S825, the simulation model generating apparatus 200 searches through the XML file 400, and finds each "PipingNetworkSegment" element listed in the XML file 400. Further, according to at least some example embodiments, in operation S825, for each "PipingNetworkSegment" element found in the XML file 400, the simulation model generating apparatus 200 extracts attribute information about the "PipingNetworkSegment" element from the XML file 400, creates a component object data structure which includes elements corresponding to the attributes of the "PipingNetworkSegment" element extracted from the XML file, and stores the created component object in the PIDpiperun list. According to at least some example embodiments, the structure of the component array shown in Table 1 discussed above with reference to operations S210 and S215 of FIG. 2 is an example of the structure of the component objects the simulation model generating apparatus 200 creates for each "PipingNetworkSegment" element found in the XML file 400 in operation S825. For example, according to at least some example embodiments, each component object created by the simulation model generating apparatus 200 in operation S825 may be created in the same manner as that described above with respect to operations S210 and S215, and the component array shown in Table 1.

In operation S830, the simulation model generating apparatus 200 may convert the attributes included in each of the component objects included in the PIDpiperun list into a series of strings, and store the series of strings in a data structure referred to, herein, as a PIDpiperunconn list along with text identifying the attributes included in each string.

According to at least some example embodiments, in operation S830, for each component object included in the PIDpiperun list, the simulation model generating apparatus 200 may read the 32-hexadecimal number identifier of the component object (and the 32-hexadecimal number identifiers of any corresponding sub-components), and convert the unique 32-hexadecimal number identifiers into n-digit unique identifiers, for example, in the same manner discussed above with respect to operation S820. According to at least some example embodiments, the simulation model generating apparatus 200 may generate the PIDpiperunconn list in operation S830 by storing the unique 4-digit values generated in operation S230 in the PIDpiperunconn list as unique IDs corresponding to each of the component objects and sub-components of the PIDpiperun list, in place of the 32-hexadecimal number identifiers from which the unique 4-digit values were converted.

In operation S835, the simulation model generating apparatus 200 extracts, from the received XML file, information about process instrument components described in the XML file, and stores the extracted information in a data structure referred to, herein, as a ProcInst list.

For example, according to at least some example embodiments, in operation S835, the simulation model generating apparatus 200 searches through the XML file 400, and finds each "ProcessInstrument" element listed in the XML file 400. Further, according to at least some example embodiments, in operation S835, for each "ProcessInstrument" element found in the XML file 400, the simulation model generating apparatus 200 extracts attribute information about the "ProcessInstrument" element from the XML file 400, creates a component object data structure which includes elements corresponding to the attributes of the "ProcessInstrument" element extracted from the XML file, and stores the created component object in the ProcInst list. According to at least some example embodiments, the structure of the component array shown in Table 1 discussed above with reference to operations S210 and S215 of FIG. 2 is an example of the structure of the component objects the simulation model generating apparatus 200 creates for each "ProcessInstrument" element found in the XML file 400 in operation S835. For example, according to at least some example embodiments, each component object created by the simulation model generating apparatus 200 in operation S835 may be created in the same manner as that described above with respect to operations S210 and S215, and the component array shown in Table 1.

In operation S840, the simulation model generating apparatus 200 may convert the attributes included in each of the component objects included in the ProcInst list into a series of strings, and store the series of strings in a data structure referred to, herein, as a ProcInstList list along with text identifying the attributes included in each string.

According to at least some example embodiments, in operation S840, for each component object included in the ProcInst list, the simulation model generating apparatus 200 may read the 32-hexadecimal number identifier of the component object (and the 32-hexadecimal number identifiers of any corresponding sub-components), and convert the unique 32-hexadecimal number identifiers into n-digit unique identifiers, for example, in the same manner discussed above with respect to operation S820. According to at least some example embodiments, the simulation model generating apparatus 200 may generate the ProcInstList list in operation S840 by storing the unique 4-digit values generated in operation S230 in the ProcInstList list as unique IDs corresponding to each of the component objects and sub-components of the ProcInst list, in place of the 32-hexadecimal number identifiers from which the unique 4-digit values were converted.

After operation S840, the simulation model generating apparatus 200 may create a simulation model page and populate the simulation model page with simulation node objects, link objects and/or instrumentation objects based on each of the components defined in each of the component object lists (e.g., the EQcoord list, the PIDpiperunconn list, and the ProcInstList list). For example, the simulation model generating apparatus 200 may loop through the EQcoord list and create a simulation node object for each component object included in the EQcoord list, using the syntax of the desired simulation modeling software environment. Further, the simulation model generating apparatus 200 may loop through the PIDpiperunconn list and create a simulation link object for each component object included in the PIDpiperunconn list, using the syntax of the desired simulation modeling software environment. Further, the simulation model generating apparatus 200 may loop through the ProcInstList list and create a simulation instrument object for each component object included in the ProcInstList list, using the syntax of the desired simulation modeling software environment. The simulation model generating apparatus 200 may populate the simulation model page with the created simulation node objects, link objects and/or instrumentation objects. The operations of creating the simulation model page and populating the simulation model page with simulation node objects and link objects will be discussed in greater detail below with reference to operations S845 and S847.

For example, in operation S845, the simulation model generating apparatus 200 may identify a number and position of nodes, and in operation S847 the simulation model generating apparatus 200 may identify links. According to at least some example embodiments, the simulation model generating apparatus 200 performs operation S845 in the same manner discussed above with respect to operations S605-S625 of FIG. 6, and performs operation S847 in the same manner discussed above with respect to operations S705-S725 of FIG. 7. For example, the EQcoord list created in operation S820 may correspond to the endpoint and on-link node array lists discussed above with reference to FIGS. 5 and 6. Further, the PIDpiperunconn and ProcInstList lists created in operation S830 and S840 may correspond to the link array list discussed above with reference to FIGS. 5 and 7. Accordingly, in operations S845 and S847, the simulation model generating apparatus 200 generates and populates a simulation model file according to the syntax of the desired simulation modeling software environment.

After operations S845 and S847, in operation S850, a simulation model page is output. For example, in operation S850, the simulation model file generated in operations S845 and S847 may be imported into (or, exported to) the desired simulation modeling software environment as a simulation model page. For example, according to at least some example embodiments, in operation S850, the simulation model generating apparatus 200 may provide the simulation model page generated in operations S845 and S847 to an application corresponding to the desired simulation modeling software environment. Further, according to at least some example embodiments, in operation S850, the simulation model generating apparatus 200 may output the simulation model page generated in operations S845 and S847 to a destination (e.g., folder) chosen by a user of the simulation model generating apparatus 200, with or without providing the simulation model page to an application corresponding to the desired simulation modeling software environment.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A method of facilitating modeling of a system, the method comprising:
receiving, at a processor, an extensible markup language (XML) file corresponding to a piping and instrumentation diagram (PID) of the system;
identifying, by the processor, components of the system that are described in the XML file, the XML file including information about attributes of the identified components,
the identifying including identifying a corresponding XML element in the XML file for each component;
generating, by the processor, a corresponding component object data structure for each identified XML element;
storing, by the processor, information about the attributes of the identified components in the generated component object data structures; and
generating, by the processor, a simulation model page using syntax of a simulation modeling software environment,
the generating of the simulation model page being based on the information about the attributes of the identified components stored in the generated component object data structures.

2. The method of claim 1, wherein the system is a process plant system.

3. The method of claim 2, wherein the XML file follows PID XML Standard ISO 15926.

4. The method of claim 1, wherein each generated component object data structure is an array that includes attributes of the identified XML element to which the generated component object data structure corresponds as array elements.

5. The method of claim 4, further comprising:
generating an endpoint node array list, a link array list, and an on-link node array list; and
based on a type of the identified XML element to which each array corresponds, adding each array to one of the endpoint node array list, the link array list, and the on-link node array list,
the endpoint node array list including arrays corresponding to identified XML elements that are defined as origin nodes or termination nodes of links in accordance with design rules of the simulation software modeling environment,
the on-link node array list including arrays corresponding to identified XML elements that are designated as nodes that are placed on top of links in accordance with design rules of the simulation software modeling environment,
the link array list including arrays corresponding to identified XML elements that are defined as links in accordance with design rules of the simulation software modeling environment.

6. The method of claim 5, further comprising:
for each identified XML element, extracting, by the processor, attribute information of the identified XML element from the XML file.

7. The method of claim 6 wherein the storing comprises:
for each generated component object data structure, storing, as one or more elements of the generated component object data structure, the attribute information extracted from the identified XML element to which the generated component object data structure corresponds.

8. The method of claim 1, further comprising:
generating a list of strings defining the identified components,
the list of strings including information based on the information about the attributes of the identified components.

9. The method of claim 8, wherein the generating of the simulation model page comprises:
reading from the list of strings, by the processor, attributes of each component defined by the list of strings;
creating a simulation object for each component defined by the list of strings, based on the read attributes; and
populating the simulation model page with the simulation objects created for the components defined by the list of strings.

10. A simulation model generating apparatus comprising:
memory storing computer-executable instructions; and
one or more processors configured to execute the computer-executable instructions such that the one or more processors are configured to perform operations including,
receiving an extensible markup language (XML) file corresponding to a piping and instrumentation diagram (PID) of a system,
identifying components of the system that are described in the XML file, the XML file including information about attributes of the identified components, the identifying including identifying a corresponding XML element in the XML file for each component,
generating, by the processor, a corresponding component object data structure for each identified XML element,
storing information about the attributes of the identified components in the generated component object data structures, and
generating a simulation model page using syntax of a simulation modeling software environment,
the generating of the simulation model page being based on the information about the attributes of the identified components stored in the generated component object data structures.

11. The apparatus of claim 10, wherein the system is a process plant system.

12. The apparatus of claim 11, wherein the XML file follows PID XML Standard ISO 15926.

13. The apparatus of claim 10, wherein the one or more processors are configured to execute the computer-executable instructions such that each generated component object data structure is an array that includes attributes of the identified XML element to which the generated component object data structure corresponds as array elements.

14. The apparatus of claim 13, wherein the one or more processors are configured to execute the computer-executable instructions such that the one or more processors are further configured to,
generate an endpoint node array list, a link array list, and an on-link node array list, and
based on a type of the identified XML element to which each array corresponds, add each array to one of the endpoint node array list, the link array list, and the on-link node array list,
the endpoint node array list including arrays corresponding to identified XML elements that are defined as origin nodes or termination nodes of links in accordance with design rules of the simulation software modeling environment, the on-link node array list including arrays corresponding to identified XML elements that are designated as nodes that are placed on top of links in accordance with design rules of the simulation software modeling environment, the link array list including arrays corresponding to identified XML elements that are defined as links in accordance with design rules of the simulation software modeling environment.

15. The apparatus of claim 14, wherein the one or more processors are configured to execute the computer-executable instructions such that the one or more processors are further configured to, for each identified XML element, extract attribute information of the identified XML element from the XML file.

16. The apparatus of claim 15 wherein the one or more processors are configured to execute the computer-executable instructions such that the storing information about the attributes of the identified components includes, for each generated component object data structure, storing, as one or more elements of the generated component object data structure, the attribute information extracted from the identified XML element to which the generated component object data structure corresponds.

17. The apparatus of claim 10, wherein the one or more processors are configured to execute the computer-executable instructions such that the one or more processors are further configured to, generate a list of strings defining the identified components, the list of strings including information based on the information about the attributes of the identified components.

18. The apparatus of claim 17, wherein the one or more processors are configured to execute the computer-executable instructions such that the generating of the simulation model page includes, reading, from the list of strings, attributes of each component defined by the list of strings, creating a simulation object for each component defined by the list of strings, based on the read attributes, and populating the simulation model page with the simulation objects created for the components defined by the list of strings.

\* \* \* \* \*